(12) United States Patent
Jansson

(10) Patent No.: US 6,464,572 B2
(45) Date of Patent: Oct. 15, 2002

(54) PORTABLE POWER TOOL WITH AN ANTI-VIBRATION BALANCING DEVICE

(75) Inventor: Anders Urban Jansson, Älvsjö (SE)

(73) Assignee: Atlas Copco Tools AB, Nacka (SE)

( * ) Notice: Subject to any disclaimer, the term of this patent is extended or adjusted under 35 U.S.C. 154(b) by 0 days.

(21) Appl. No.: 09/801,281

(22) Filed: Mar. 7, 2001

(65) Prior Publication Data

US 2001/0031616 A1 Oct. 18, 2001

(30) Foreign Application Priority Data

Mar. 8, 2000 (SE) .............................................. 0000761

(51) Int. Cl.⁷ .............................................. B24B 23/02
(52) U.S. Cl. ..................... 451/344; 451/359; 451/295; 451/343
(58) Field of Search ................... 451/343, 295, 451/359, 344; 74/573 R

(56) References Cited

U.S. PATENT DOCUMENTS

| 2,164,900 A | * | 7/1939 | Campbell | 451/343 |
|---|---|---|---|---|
| 2,507,558 A | * | 5/1950 | Dall et al. | 451/343 |
| 3,692,370 A | * | 9/1972 | Hasz | 451/343 |
| 3,731,556 A | * | 5/1973 | Decker | 74/573 R |
| 3,885,355 A | * | 5/1975 | Kakimoto | 451/295 |
| 5,111,713 A | * | 5/1992 | Cameron et al. | 74/573 R |
| 5,839,950 A | * | 11/1998 | Edling et al. | 451/359 |

FOREIGN PATENT DOCUMENTS

SU 136214 * 5/1961 .................. 451/343

* cited by examiner

*Primary Examiner*—Robert A. Rose
(74) *Attorney, Agent, or Firm*—Frishauf, Holtz, Goodman & Chick, P.C.

(57) ABSTRACT

A portable power tool is provided which has a rotating output shaft (13) journalled in two axially spaced bearings (15, 16). A working implement mounting device (19) and an anti-vibration balancing unit (20) are provided at a forward end (13a) of the output shaft (13). And an auxiliary balancer (26) is provided at a rear end (13b) of the output shaft (13) for dynamic balancing of rotating parts including a working implement (17) mounted on the output shaft (13) at operation of the power tool.

6 Claims, 1 Drawing Sheet

PORTABLE POWER TOOL WITH AN ANTI-VIBRATION BALANCING DEVICE

FIELD OF THE INVENTION

The invention relates to a portable power tool of the type having a rotating output shaft provided with an anti-vibration balancing device in the form of a ball type balancing unit for dampening unbalance in a working implement connected to the output shaft.

BACKGROUND OF THE INVENTION

In the prior art there are known power tools, such as disclosed in U.S. Pat. No. 5,839,950, which are provided with a ball type balancing unit carried at the forward end of the output shaft so as to accomplish an automatic balancing of the vibration forces generated by a grinding wheel attached to the output shaft. By such an arrangement there is obtained a static balancing only, and since there is an inevitable axial distance between the grinding wheel and the balancing unit there will still be dynamic forces causing vibrations with respect to an axis of inertia of the tool. These vibrations can cause an uncomfortable and sometimes a detrimental working situation for the tool operator.

OBJECT OF THE INVENTION

It is a primary object of the invention to accomplish a portable power tool of the above type in which the static as well as the dynamic vibration forces are counteracted such that the working situation for the operator is improved.

Further objects and advantages of the invention will appear from the following specification and claims.

BRIEF DESCRIPTION OF THE DRAWINGS

A preferred embodiment of the invention is hereinafter described in detail with reference to the accompanying drawings, in which.

DETAILED DESCRIPTION

Figure 1:
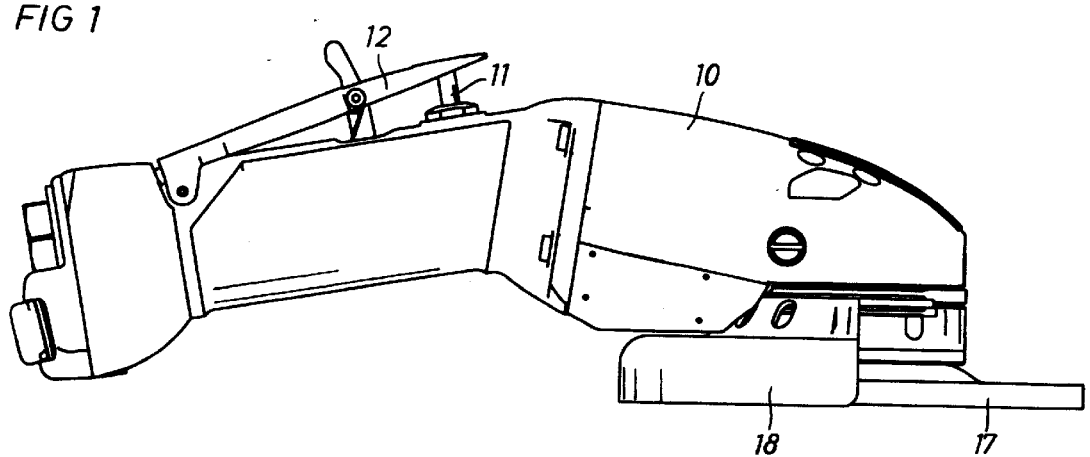
FIG. 1 shows a side view of a pneumatic angle grinder according to the invention.

The power tool shown in the drawings is a pneumatic angle grinder comprising a housing 10, a rotation motor (not shown), a pressure air inlet valve 11 controlled by a lever 12, and an output shaft 13. The output shaft 13 has a forward end 13a journalled in a forward bearing 15 and a rear end 13b journalled in a rear bearing 16. The output shaft 13 is also fitted with a mounting device for a grinding wheel 17, and on the housing 10 there is mounted a safety guard 18 partly surrounding the grinding wheel 17 for protection against incidental wheel disintegration.

The mounting device which is secured in a concentric threaded bore 19 in the output shaft 13 does not form part of the invention and is therefore not described in further detail. This type of mounting device, however, is described in the above mentioned U.S. Pat. No. 5,839,950.

At its forward end 13a, the output shaft 13 is provided with a balancing unit 20 of the type having a number of balls 21 freely movable along a circular race 22 for self adjustment and compensation for imbalance forces in the attached grinding wheel 17. The balancing unit 20 which is formed integrally with the output shaft 13 includes a cover washer 23 for sealing off the ball race 22 and maintaining the balls 21 in place.

The motor is connected to the output shaft 13 via an angle drive comprising a pinion 24 connected to the motor and a bevel gear 25 mounted on the output shaft 13 in a location between the forward bearing 15 and the rear bearing 16.

At its rear end 13b, the output shaft 13 carries an auxiliary ball type balancer 25 which comprises a ring element 27 defining a circular path for a number of balls 28, and a mounting screw 29 engaging a central threaded bore in the output shaft 13 for securing the ring element 27 to the output shaft 13. The auxiliary balancer 26 is located behind the rear shaft bearing 16 and is intended to dampen the dynamic vibration forces not being taken care of by the forward balancing unit 20. The forward balancing unit 20 is effective in accomplishing a static balancing of the grinding wheel 17, i.e. generating a counteracting oppositely directed force equal to the imbalance force of the grinding wheel 17, but since this counteracting force is not applied in the same plane as the imbalance force of the grinding wheel 17 there will be a moment acting on the output shaft 13 causing vibrations.

Figure 3:
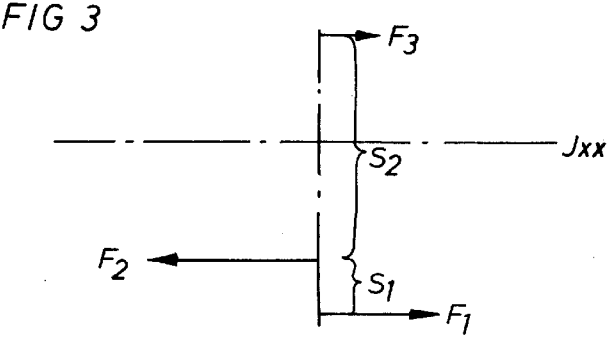
FIG. 3 shows a diagrammatic illustration of the balancing forces of the anti-vibration system according to the invention.

As illustrated in FIG. 3, the grinder has a principal axis of inertia $J_{xx}$, and the vibratory moment resulting from the imbalance force $F_1$ developed in the grinding wheel 17 and the counteracting compensating force $F_2$ provided by the balancing unit 20 at a distance $S_1$ makes the entire grinder oscillate with respect to the principal axis of inertia $J_{xx}$.

To compensate for the vibratory moment, the auxiliary balancer 26 is located at the rear end of the output shaft 13, behind the rear bearing 16, to generate a dampening force $F_3$ acting at a distance $S_2$ from the compensating force $F_2$. Due to the fact that the distance $S_2$ is much larger than the distance $S_1$, the balancing force $F_3$ needed from the auxiliary balancer 26 is considerably smaller than the force $F_1$, because $F_1 * S_1$ shall equal $F_3 * S_2$. See FIG. 3.

By locating the auxiliary balancer 26 at as long as possible a distance from the forward balancing unit 20 the required balancing force $F_3$ and, hence, the size of the auxiliary balancer 26 can be kept small.

Figure 2:
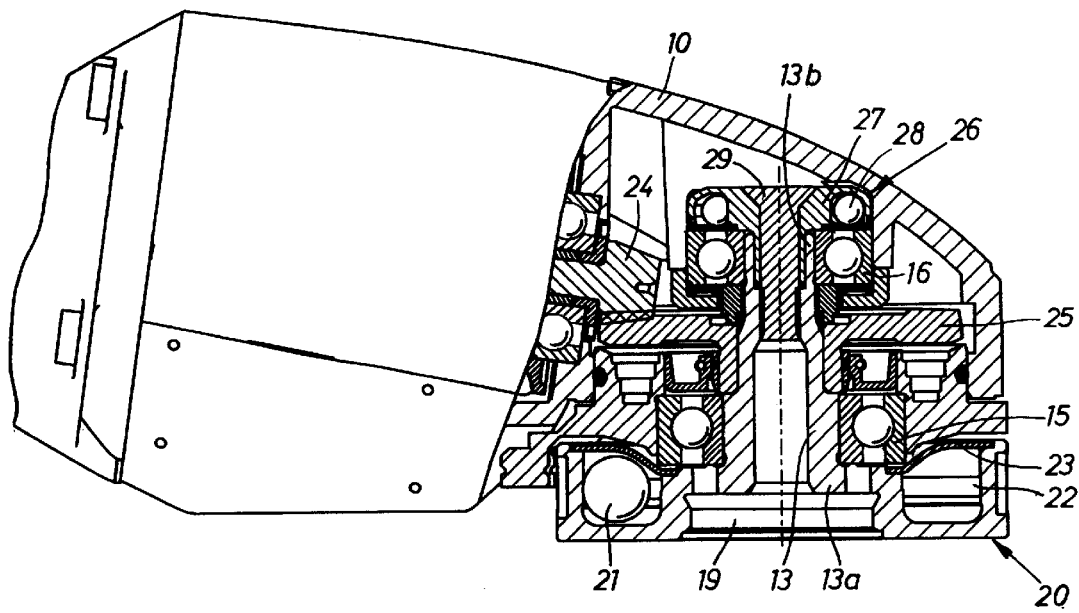
FIG. 2 shows a section through the forward end of the angle grinder shown in FIG. 1.

As can be seen in FIG. 2, the balls 28 of the auxiliary balancer 26 have a smaller size than the balls 21 of the forward balancing unit 20.

What is claimed is:

1. A portable power tool with an anti-vibration balancing device, comprising:

a housing, a rotation motor, an output shaft journalled in the housing, and having a rear end and a forward end, a working implement mounting device provided at the forward end of the output shaft, a forward balancing unit also provided at the forward end of the output shaft, a power transmission coupling the motor to the output shaft, an auxiliary balancer secured to the rear end of the output shaft for accomplishing a dynamic balancing of the output shaft during operation with an unbalanced working implement attached to the working implement mounting device, wherein the auxiliary balancer and the forward balancing unit each comprise balls, and the balls of the auxiliary balancer have a smaller size than a size of the balls of the forward balancing unit.

2. The power grinder according to claim 1, wherein the output shaft is journalled in a forward bearing located close to the forward end of the output shaft, and a rear bearing axially spaced from the forward bearing, and wherein the balancing unit is located in front of the forward bearing, and the auxiliary balancer is located behind the rear bearing.

3. The power grinder according to claim 1, wherein the power transmission comprises an angle drive including a pinion connected to the motor, and a bevel gear secured to the output shaft at a location between the forward bearing and the rear bearing.

4. The power grinder according to claim 3, wherein the forward end of the output shaft and the forward balancing unit extends out of the housing, and the rear end of the output shaft and the auxiliary balancer are located inside the housing.

5. The power grinder according to claim 2, wherein the power transmission comprises an angle drive including a pinion connected to the motor, and a bevel gear secured to the output shaft at a location between the forward bearing and the rear bearing.

6. The power grinder according to claim 5, wherein the forward end of the output shaft and the forward balancing unit extends out of the housing, and the rear end of the output shaft and the auxiliary balancer are located inside the housing.

* * * * *